(12) United States Patent
Niu et al.

(10) Patent No.: US 12,457,641 B2
(45) Date of Patent: Oct. 28, 2025

(54) SYSTEMS, METHODS, AND DEVICES FOR NR SIDELINK IN THE UNLICENSED SPECTRUM

(71) Applicant: Apple Inc., Cupertino, CA (US)

(72) Inventors: Huaning Niu, San Jose, CA (US); Wei Zeng, Saratoga, CA (US); Dawei Zhang, Saratoga, CA (US); Chunxuan Ye, San Diego, CA (US); Oghenekome Oteri, San Diego, CA (US); Hong He, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 396 days.

(21) Appl. No.: 17/735,193

(22) Filed: May 3, 2022

(65) Prior Publication Data
US 2022/0394768 A1 Dec. 8, 2022

Related U.S. Application Data

(60) Provisional application No. 63/197,741, filed on Jun. 7, 2021.

(51) Int. Cl.
*H04W 74/0816* (2024.01)
*H04W 72/23* (2023.01)
*H04W 92/18* (2009.01)

(52) U.S. Cl.
CPC ....... *H04W 74/0816* (2013.01); *H04W 72/23* (2023.01); *H04W 92/18* (2013.01)

(58) Field of Classification Search
CPC .. H04W 74/0816; H04W 72/23; H04W 92/18
(Continued)

(56) References Cited

U.S. PATENT DOCUMENTS

2020/0351669 A1* 11/2020 Xu .............. H04W 76/14
2021/0051646 A1* 2/2021 Maaref .......... H04W 72/02
(Continued)

OTHER PUBLICATIONS

EP Extended Search Report dated Sep. 28, 2022 in connection with Application Serial No. EP22172867.
(Continued)

*Primary Examiner* — Nicholas R Taylor
*Assistant Examiner* — Chong G Kim
(74) *Attorney, Agent, or Firm* — Eschweiler & Potashnik, LLC; Matthew W Glause

(57) ABSTRACT

Techniques described herein include solutions for enabling NR sidelink (SL) communications by using radio resource control (RRC) to provide ser equipment (UEs) with grant configuration (CGs) for unidirectional and/or bidirectional SL communications. These techniques also include solutions for UEs to obtain channel occupation times (COTs) for SL communications, and procedures for sharing COTs with other UEs, and procedures for CG uplink control information (UCI) of physical uplink shared channels (PUSCH) transmissions for NR in the unlicensed spectrum (NR-U). The techniques described herein also include solutions for channel state information (CSI) feedback for CGs of SL in the unlicensed spectrum (CG-Sidelink-U). Also described herein are SL techniques for transmission power control of SL communications and clear channel assessment (CCA) procedures.

20 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0368542 | A1* | 11/2021 | Xue | H04W 72/23 |
| 2021/0391907 | A1* | 12/2021 | Wang | H04B 7/0632 |
| 2022/0015133 | A1* | 1/2022 | Fong | H04L 1/0061 |
| 2022/0279377 | A1* | 9/2022 | Liu | H04W 80/02 |
| 2022/0360302 | A1* | 11/2022 | Xue | H04B 7/0695 |
| 2023/0269769 | A1* | 8/2023 | Ganesan | H04W 74/0808 |
| | | | | 370/328 |
| 2023/0422299 | A1* | 12/2023 | Kiilerich Pratas | ............ |
| | | | | H04W 74/0808 |
| 2024/0163835 | A1* | 5/2024 | Thomas | H04W 64/00 |

OTHER PUBLICATIONS

Spreadtrum Communications; Discussion on resource allocation for mode 2; 3GPP TSG RAN WG1 Meeting #94bis; R1-1811007; Oct. 8, 2018.
Apple; Considerations on NR V2X physical layer procedure; 3GPP TSG RAN W61 #98; R1-1909054; Aug. 26, 2019.
3rd Generation Partnership Project; Technical Specification Group Services and System Aspects; Study on Network Controlled Interactive Services; (Release 17); 3GPP TR 22.842 V17.2.0 (Dec. 2019); http://www.3gpp.org.
3rd Generation Partnership Project; Technical Specification Group Radio Access Network; Physical layer procedures for shared spectrum channel access; (Release 16); 3GPP TS 37.213 V16.5.0 (Mar. 2021); http://www.3gpp.org.
Multiple-Gigabit/s radio equipment operating in the 60 GHz band; Harmonised Standard for access to radio spectrum; Final draft ETSI EN 302 567 V2.2.1 (May 2021); http://www.etsi.org/standards-search.
European Office Action dated Dec. 18, 2024 in connection with Application No. 22172867.8.

* cited by examiner

SYSTEMS, METHODS, AND DEVICES FOR NR SIDELINK IN THE UNLICENSED SPECTRUM

REFERENCE TO RELATED APPLICATIONS

This application is a Non-Provisional Application of U.S. Provisional Application No. 63/197,741 filed Jun. 7, 2021, entitled "SYSTEMS, METHODS, AND DEVICES FOR NR SIDELINK IN THE UNLICENSED SPECTRUM", the contents of which are herein incorporated by reference in their entirety

FIELD

This disclosure relates to wireless communication networks including techniques for enabling new radio radar (NR) sidelink (SL) within a wireless communication network.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices (e.g., user equipment (UE)) may establish sidelinks (SLs) between one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include user equipment (UEs) capable of communicating with base stations and other network nodes. UEs may also be capable of communicating with one another directly via using sidelink (SL) communication. SL communications, as described herein, may include one or more frequency bands, of an unlicensed wireless spectrum (e.g., frequency range 1 (FR1) from 450 MHz to 6,000 MHz, frequency range 2 (FR2) from 24250 MHz to 52600 MHz, and potential up to 71 GHz). SL communications may be beneficial for network environments involving a network control interactive service (NCIS), requiring high throughput and low latency (e.g., an indoor factory floor comprising many wireless communication devices), and so on.

Techniques, described herein, include solutions for enabling SL communications. These techniques may include the use of radio resource control (RRC) messaging for providing UEs with grant configuration (CGs) (e.g., timing, frequency, channel, periodicity, etc.) for unidirectional and/or bidirectional SL communications. These techniques may also include solutions for UEs to obtain channel occupancy times (COTs) for SL communications, and rules for sharing COTs with other UEs, and rules for CG uplink control information (UCI) of physical uplink shared channels (PUSCH) transmissions for NR in the unlicensed spectrum (NR-U). The techniques described herein may also include solutions for channel state information (CSI) feedback for CGs of SL in the unlicensed spectrum (CG-Sidelink-U). Also described herein are SL techniques for exercising transmission power control of SL communications and performing clear channel assessment (CCA) procedures. Thus, techniques, described herein, may apply to indoor SL transmissions in an unlicensed band, implement NR-U techniques and Uu link design (up to 71 GHz) of the 3GPP communication standards, provide RRC configuration of UE pairs, CCA procedures for SL communications, and interference control to enable dense usage. Non-limiting examples, implementations, features, aspects, and details of these techniques and solutions are described below with reference to the Figures. As used herein, terms such as CG-Sidelink, CG-Sidelink-U, CG SL, etc., may generally refer to a configuration grant for engaging in SL communications involving an unlicensed wireless spectrum.

Figure 1:
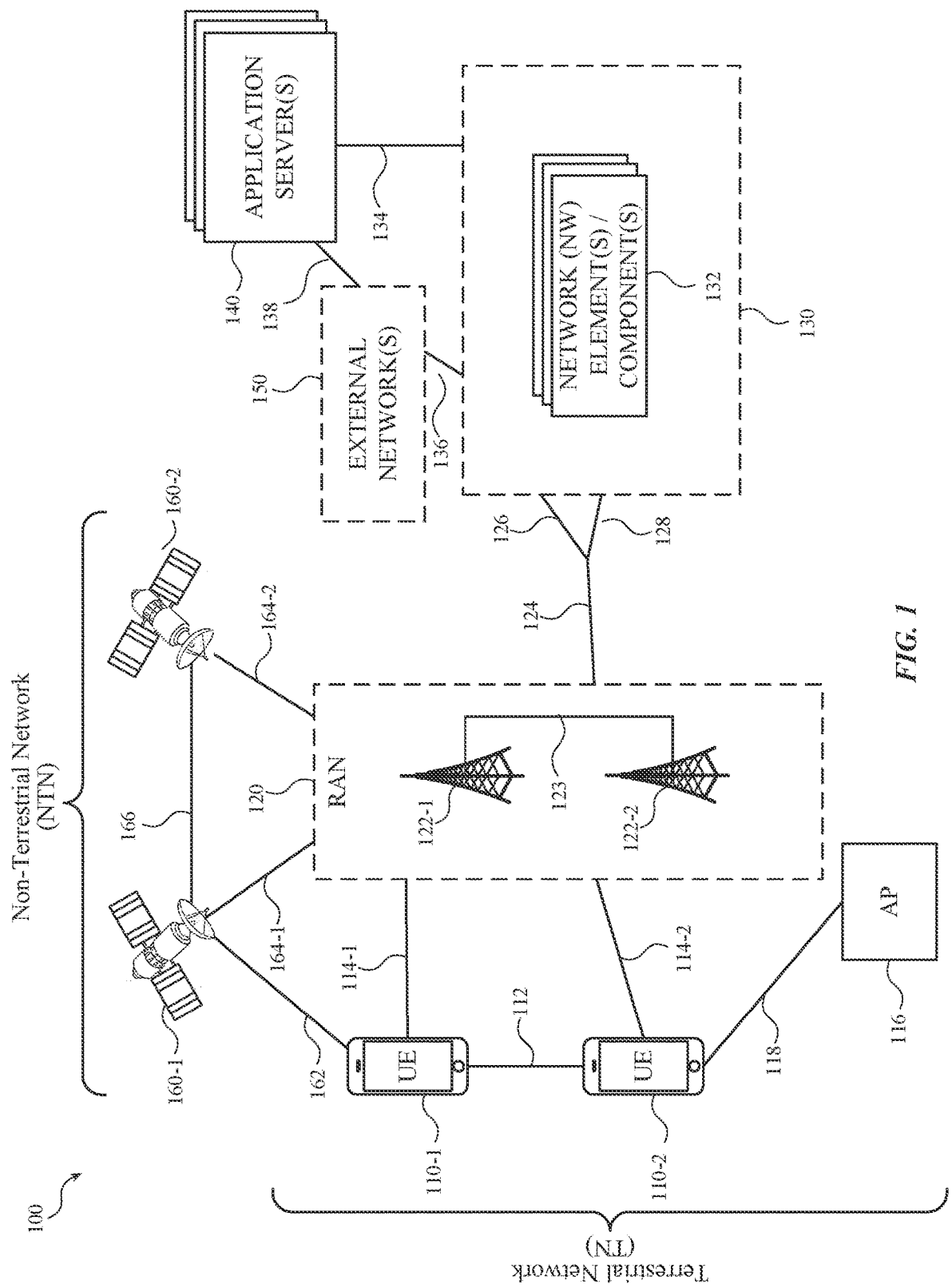
FIG. 1 is a diagram of an example network according to one or more implementations described herein.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NRDC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The physical downlink control channel (PDCCH) may carry user data and higher layer signaling to UEs 110. The PDCCH may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
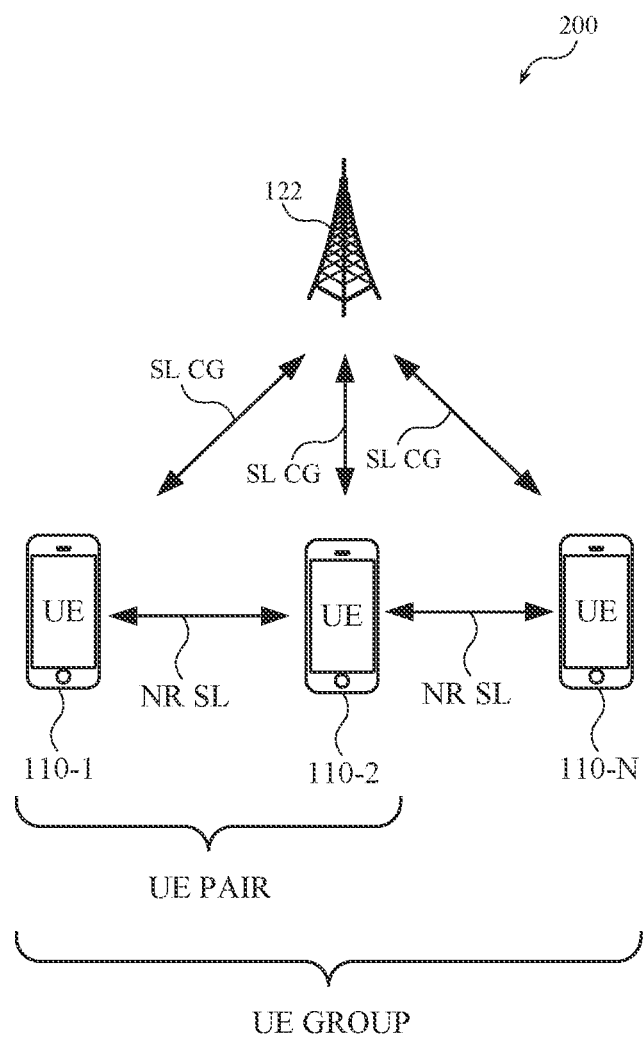
FIG. 2 is a diagram of an example of new radio (NR) sidelink (SL) connections between user equipment (UEs) of a wireless telecommunications network.

FIG. 2 is a diagram of an example 200 of NR SL connections between UEs 110 of a wireless telecommunications network. As shown, example 200 may include base station 122 and multiple UEs 110. Base station 122 may communicate with UEs 110 using radio frequencies corresponding to a license spectrum (e.g., radio frequencies designated or reserved for cellular communications). UEs 110 may communicate with one another through SL connections or communications, which may use radio frequencies corresponding to an unlicensed spectrum (e.g., radio frequencies open for use by one or more of a variety or types of wireless communications (e.g., Wi-Fi®, Bluetooth®, etc.). In some implementations, the frequencies used for SL may include frequency range 1 (FR1) from 450 MHz to 6,000 MHz, particularly 5/6 Ghz unlicensed band, or frequency range 2 (FR2) from 24250 MHz to 52,600 MHz, with potential extension to 71000 MHz, particularly 60 GHz unlicensed band. For purposes of SL communication, UEs 110 may be organized in a UE pair, where one UE 110-1 is linked to another UE 110-2, or in a UE group, where multiple UEs 110-1, 110-2, and 110-N are linked to another.

As described below with reference to the Figures, base station 122 may use RRC signaling to provide CG information to UEs 110 for SL purposes. A CG, as described herein, may include information about resources UEs 110 may use for SL communications (e.g., timing information, frequency information, periodicity, a designation of whether the grant is for unidirectional or bidirectional SL communication, and one or more additional or alternative types of information). In some implementations, the CG may configure UEs 110 for unidirectional SL communications (e.g., where each UE 110 receives a CG to operate as a Tx UE relative to a Rx UE). In other implementations, the CG may configure UEs 110 for bidirectional SL communications (e.g., where each UE 110 may use the CG to communicate with the other UE 110). As described below in greater detail, base station 122 and UEs 110 may exchange additional, or alternative, information with one another, such as COT information, whether SL COT sharing is permitted or being implemented, CSI feedback for CG SL in the unlicensed spectrum (CG-Sidelink-U), CCA information, Tx power control information, etc.

Figure 3:
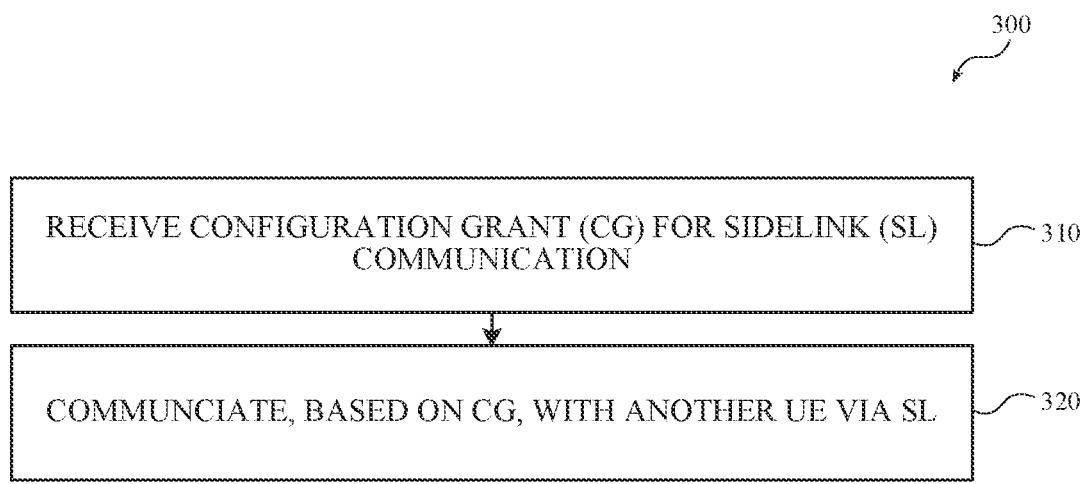
FIG. 3 is a diagram of an example of a process for enabling NR SL communications in the unlicensed spectrum.

FIG. 3 is a diagram of an example of a process 300 for enabling NR SL communications in the unlicensed spectrum. Process 300 may be implemented by UE 110. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., another UE 110, base station 122, etc.).

Process 300 may include receiving a CG for SL communication (block 310). For example, UE 110 may receive information describing wireless resources that UE 110 may use to communicate with another UE 110 via SL communication. As described herein, UE 110 may receive the CG via RRC signaling from base station 122. The RRC signaling may include one or more types of information about the CG, including whether the CG is unidirectional, bidirectional, a grant type (e.g., a type-1 grant, a type-2 grant, etc.), whether a full bandwidth (BW) is allocated, whether a partial BW is allocated, a starting point for the SL resources, a periodicity, slot offset, etc.

Process 300 may also include communicating, based on the CG, with another UE 110 via SL (block 320). For example, UE 110 may use the wireless resources of the CG to communication with another UE 110 via SL. In some implementations, the CG may be for unidirectional SL communication, in which case UE 110 may be operating as a Tx UE or a Rx UE depending on the CG information received from base station 122. In some implementations, the CG may be for bidirectional SL communication, such that UE 110 may use the same wireless resources as the other UE 110. In such scenarios, each UE 110 may implement one or more techniques, such as LBT to ensure that the wireless resources of the CG are available, channel occupancy times (COTs), UCI for CG-Sidelink-U, CSI feedback for CG-Sidelink-U, transmission power control information, and more. These and other aspects of the techniques described herein are discussed in detail below with reference to the following Figures.

Figure 4:
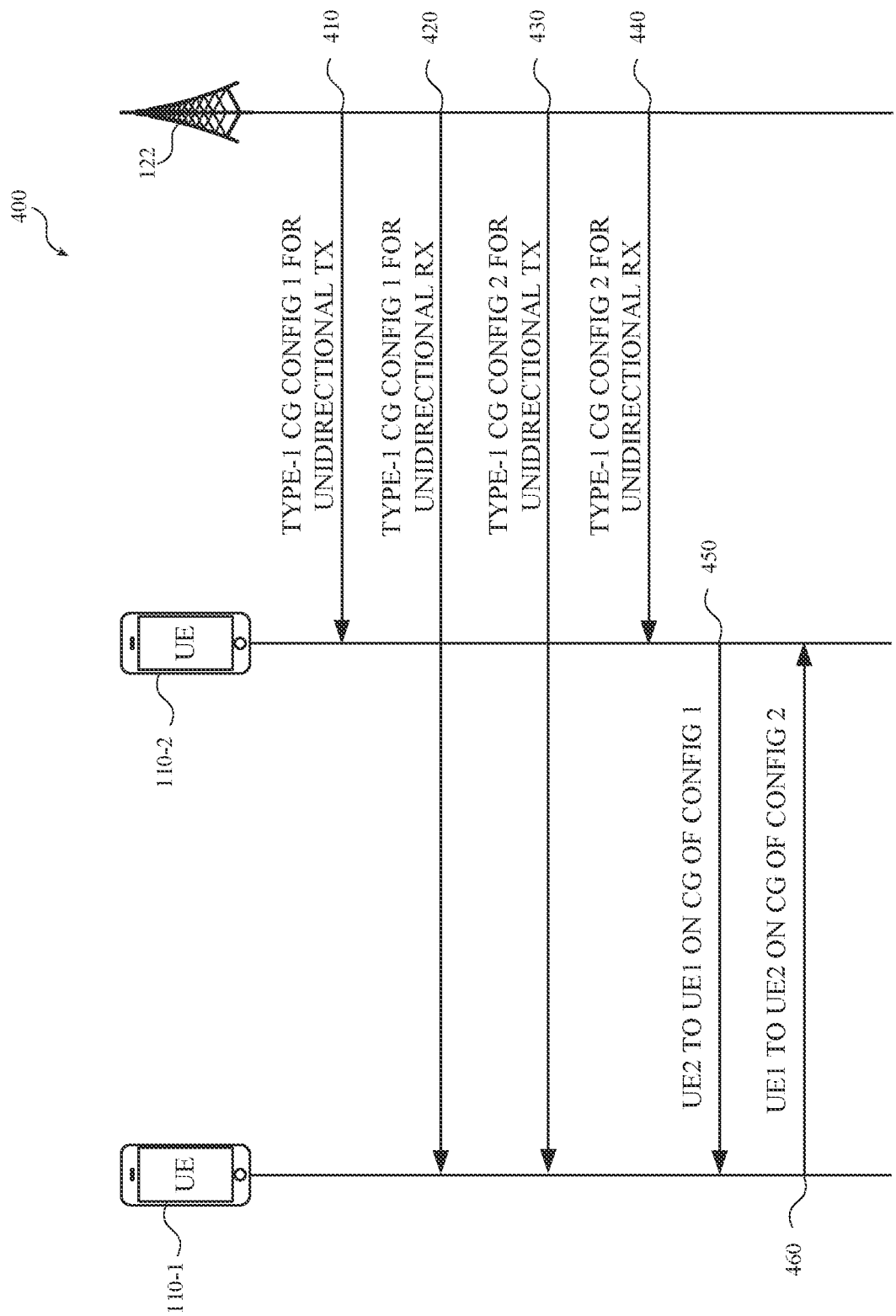
FIG. 4 is a diagram of an example of a process for enabling NR SL communications by providing unidirectional configuration grants (CGs) to user equipment (UEs) via radio resource control (RRC) messaging.

FIG. 4 is a diagram of an example 400 of a process for enabling NR SL communications by providing unidirectional CGs to UEs 110 via RRC messaging. As shown, example 400 includes UE 110-1, UE 110-2, and base station 122. In some implementations, some or all of example 400 may be performed by one or more other systems or devices, including one or more of the devices of FIG. 1. Additionally, example 400 may include one or more fewer, additional, differently ordered and/or arranged operations than those shown in FIG. 4. In some implementations, some or all of the operations of example 400 may be performed independently, successively, simultaneously, etc., of one or more of the other operations of example 400. As such, the techniques described herein are not limited to a number, sequence, arrangement, timing, etc., of the operations or process depicted in FIG. 4.

As shown, base station 122 may communicate CG information (e.g., type-1 CG Config 1 for unidirectional Tx to UE 110-2 (at 410). "Type-1" may refer to the CG, including periodicity, being provided directly to UE 110-2 via RRC signaling. "Config 1" may refer to the characteristics of the CG being provided to UE 110-2 (e.g., that the CG is for unidirectional communication where UE 110-2 is a Tx UE for the CG).

Similarly, base station 122 may communicate CG information (e.g., type-1 CG Config 1 for unidirectional Rx to UE 110-1 (at 420). "Type-1" may refer to the CG, including periodicity, being provided directly to UE 110-1 via RRC signaling. "Config 1" may refer to the characteristics of the CG being provided to UE 110-1 (e.g., that the CG is for unidirectional communication where UE 110-1 is a Rx UE for the CG).

Base station 122 may communicate different CG information (e.g., type-1 CG Config 2 for unidirectional Tx to UE 110-1 (at 430). As above, "Type-1" may refer to the CG, including periodicity, being provided directly to UE 110-2 via RRC signaling. "Config 2" may refer to the characteristics of the CG being provided to UE 110-1 (e.g., that the CG is different than the CG of Config 1 and is for unidirectional communication where UE 110-1 is a Tx UE for the CG of Config 2).

Similarly, base station 122 may communicate different CG information (e.g., type-1 CG Config 2 for unidirectional Rx to UE 110-2 (at 440). As above, "Type-1" may refer to the CG, including periodicity, being provided directly to UE 110-1 via RRC signaling. "Config 2" may refer to the characteristics of the CG being provided to UE 110-2 (e.g., that the CG is different than the CG of Config 1 and is for unidirectional communication where UE 110-2 is a Rx UE for the CG of Config 2).

UEs 110-1 and 110-2 may use the CGs of Config 1 and Config 2 to communicate with one another unidirectionally. As shown, UE 110-2 may use the CG of Config 1 to communicate with UE 110-1, where UE 110-2 operates as a Tx UE and UE 110-1 operates as a Rx UE (at 450). Similarly, UE 110-1 may use the CG of Config 2 to communicate with UE 110-2, where UE 110-1 operates as a Tx UE and UE 110-2 operates as a Rx UE (at 460). As such, the techniques described herein may include solutions for enabling NR SL communications between UEs 110 based on unidirectional CGs provided to UEs 110 via RRC signaling.

Figure 5:
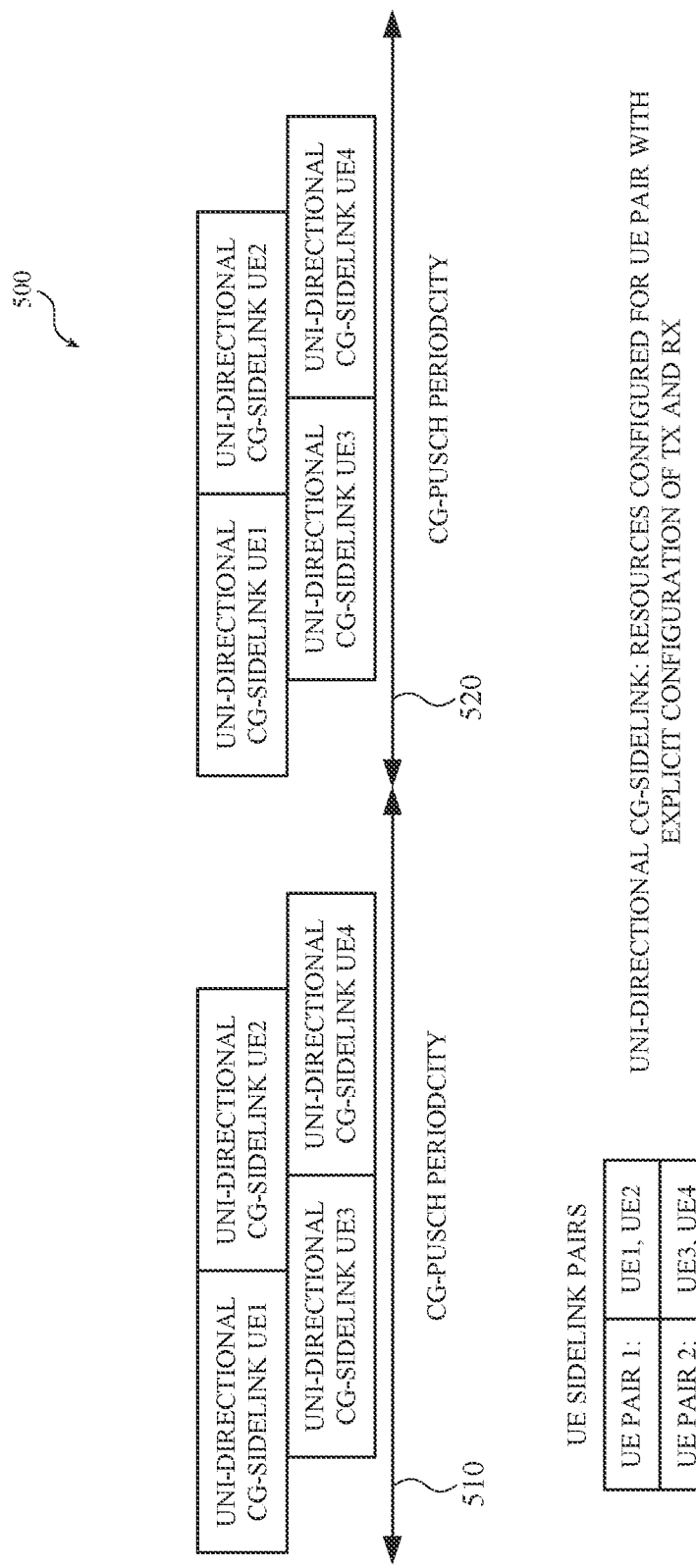
FIG. 5 is a diagram of an example of unidirectional SL CGs for UEs relative to a physical uplink shared channel (PUSCH) periodicity.

FIG. 5 is a diagram of an example 400 of unidirectional SL CGs for UEs 110 relative to a PUSCH periodicity. Techniques described above with reference to FIG. 4 may be applied to multiple pairs of UEs 110 and/or UE groups. In such scenarios, for example, base station 122 may use group cast messaging to provide CG confirmation to different UE pairs and/or UE groups. Additionally, or alternatively, the CG information provided to each UE, UE pair, and/or UE group may include different frequency, timing, periodicity, and/or other types of configuration information, such that NR SL communications are aligned or not aligned. For example, as shown in FIG. 5, while unidirectional CG-Sidelink resources for different UEs 110 of a UE pair (e.g., UE1 and UE2; UE3 and UE4; etc.) may be consecutive with respect to one another, the unidirectional CG-Sidelink resources for different UE pairs (e.g., UE pair 1 and UE pair 2) maybe offset or unaligned relative to, for example, a CG-PUSCH periodicity (510 and 520).

Figure 6:
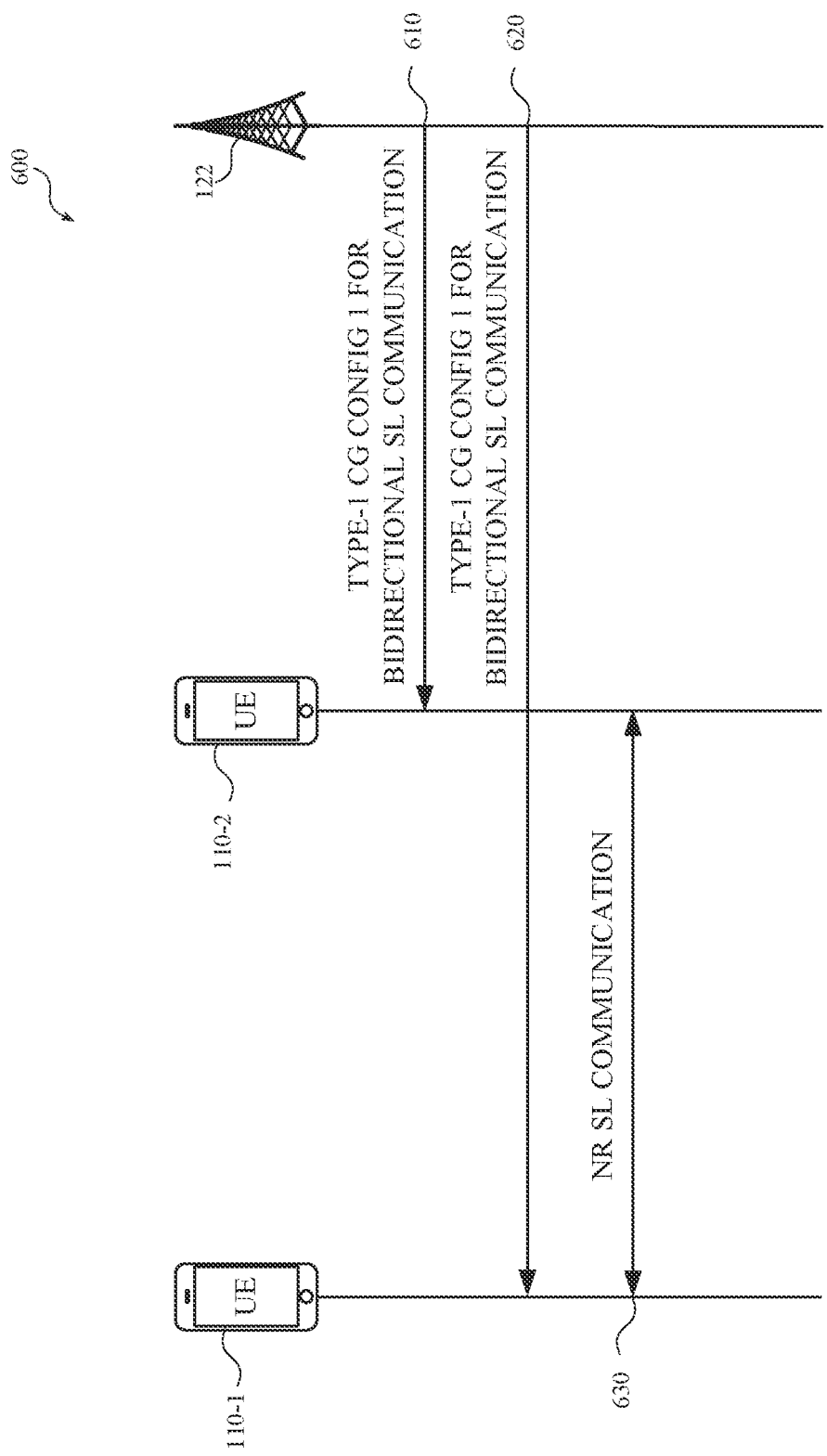
FIG. 6 is a diagram of an example of a process for enabling NR SL by providing a bidirectional CGs to UEs via RRC messaging.

FIG. 6 is a diagram of an example 600 of a process for enabling NR SL by providing a bidirectional CGs to UEs 110 via RRC messaging. As shown, example 600 includes UE 110-1, UE 110-2, and base station 122. In some implementations, some or all of example 600 may be performed by one or more other systems or devices, including one or more of the devices of FIG. 1. Additionally, example 600 may include one or more fewer, additional, differently ordered and/or arranged operations than those shown in FIG. 6. In some implementations, some or all of the operations of example 600 may be performed independently, successively, simultaneously, etc., of one or more of the other operations of example 600. As such, the techniques described herein are not limited to a number, sequence, arrangement, timing, etc., of the operations or process depicted in FIG. 6.

As shown, base station 122 may communicate CG information (e.g., type-1 CG Config 1 for bidirectional SL communication to UE 110-2 (at 610). "Type-1" may refer to the CG, including periodicity, being provided directly to UE 110-2 via RRC signaling. "Config 1" may refer to the characteristics of the CG being for bidirectional SL communications between the corresponding UE pair (e.g., UE 110-1 and UE 110-2). Similarly, base station 122 may communicate CG information (e.g., type-1 CG Config 1 for bidirectional SL communication) to UE 110-21 (at 620). "Type-1" may refer to the CG, including periodicity, being provided directly to UE 110-2 via RRC signaling. "Config 1" may refer to the characteristics of the CG being for bidirectional SL communications between the corresponding UE pair (e.g., UE 110-1 and UE 110-2). A CG for bidirectional SL communication may describe communication resources (e.g., frequency, channel, timing, periodicity, etc.) that may be used by either UE of the UE pair. As such, base station 122 may not designated a Tx UE and Rx UE for the CG.

Upon receiving the CG information from base station 122, UE 110-1 and UE 110-2 may establish a SL connection and/or engage in SL communication based on the grant information (at 630). When UE 110-1 or UE 110-2 does not have content to transmit, the UE may listen for transmissions from the other UE. When either UE 110-1 or UE 110-2 has content to transmit, the UE may perform a LBT procedure (e.g., a category 4 (CAT-4) LBT rule) to resolve communication contentions or collisions. CAT-4 LBT may involve a LBT procedure with a random backoff and a variable-length contention window. In some implementations, a LBT procedure is used in scenarios where full bandwidth (BW) is allocated for the CG (e.g., when a UE pair or UE group is not configured to share BW with another UE pair or UE group). As such, the techniques described herein may include solutions for enabling NR SL communications between UEs 110 based on bidirectional CGs provided to UEs 110 via RRC signaling.

Figure 7:
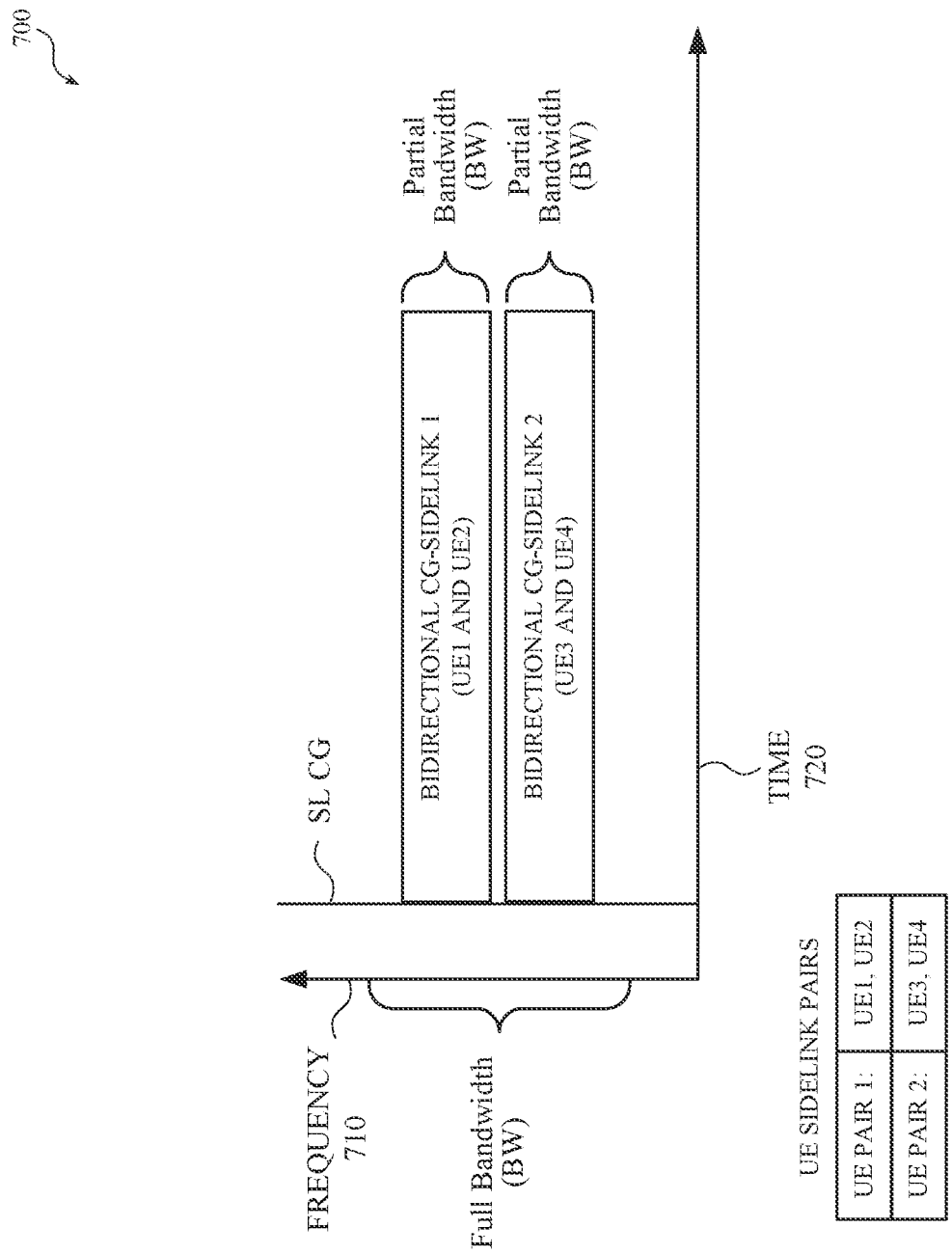
FIG. 7 is a diagram of an example of bidirectional SL CGs for UEs relative to frequency and time.

FIG. 7 is a diagram of an example 700 of bidirectional SL CGs for UEs 110 relative to frequency 710 and time 720. As shown in FIG. 7, partial BWs may be allocated in a CG, such that different UE pairs (e.g., UE pair 1 and UE pair 2) may have SL CGs comprising different portions of the same BW. UEs 110 of different SLs may be configured to not block transmission of the other SL CG transmission that frequency division multiplexed (FDMed). As such, when a CG only includes a partial BW, one or more techniques may be implemented to avoid or minimize signal collisions.

Figure 8:
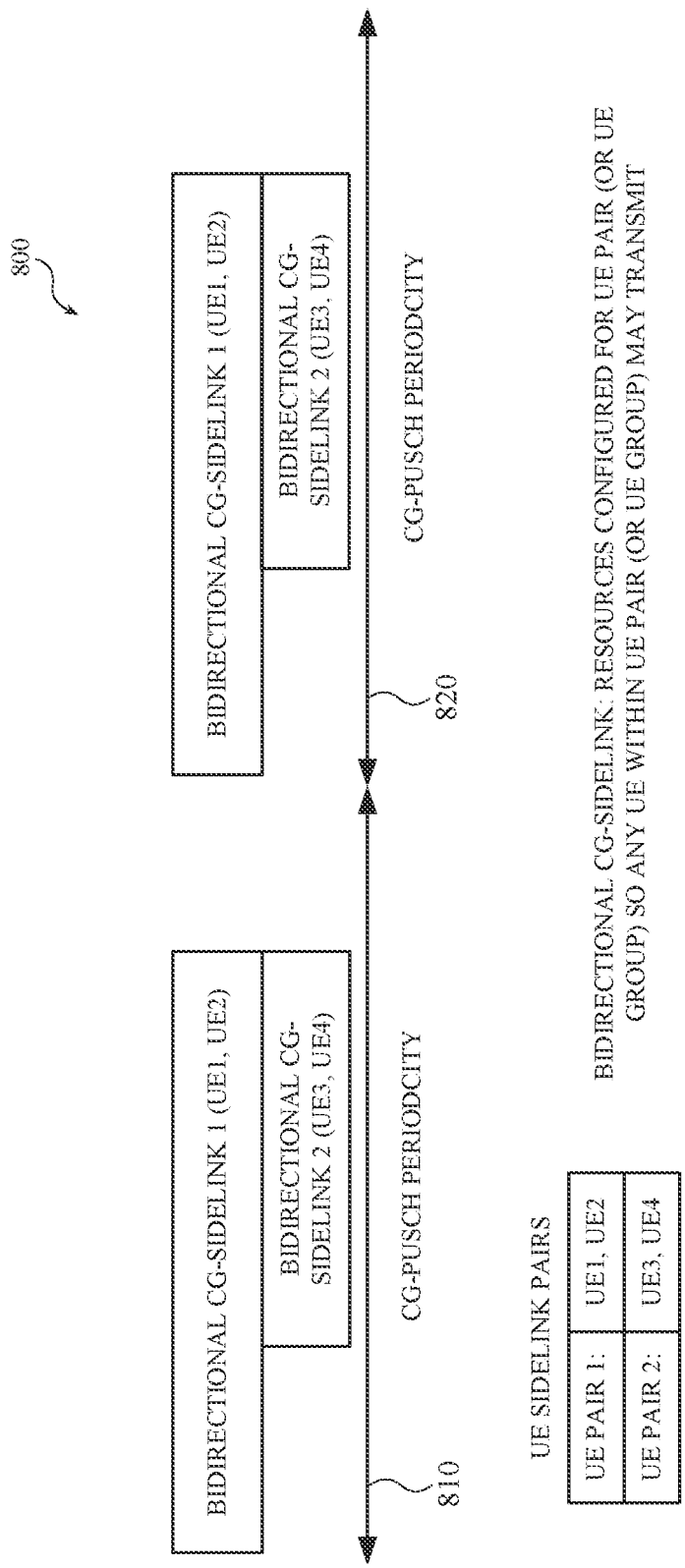
FIG. 8 is a diagram of an example of bidirectional SL CGs for UEs relative to a PUSCH periodicity.

FIG. 8 is a diagram of an example 800 of bidirectional SL CGs for UEs 110 relative to a PUSCH periodicity. As shown, base station 122 may use RRC signaling to configure different starting points for each UE within a CG-Sidelink-U grant. A CG for one UE pair (e.g., bidirectional CG-Sidelink 1 for UE1 and UE2) may be configured with a different starting point than a CG for another UE pair (e.g., bidirectional CG-sidelink 2 for UE3 and UE4) relative to a CG-PUSCH periodicity (810 and 820). As another example of a technique for avoiding or minimizing signal collisions, each CG-Sidelink grant (or SL CG) may include two or more values that UEs receiving the grant may alternate between, or select at random, to help avoid potential collisions. Examples of such values may include 9 us, 18 us, 27 us, 36 us, 45 us or 54 us for 5/6 GHz unlicensed band, counting from the start OFDM symbol of the CG grant, or 5 us, 10 us, 15 us, 20 us . . . ] for 60 GHz unlicensed band. In some implementations, each SL CG may multiple partial BW resources and UE 110 may select a partial BW resource from the SL CG when transmitting a SL communication.

While some techniques involving unidirectional grants and/or bi-directional grants, as described herein, may be discussed in terms of a type-1 configuration grants (e.g., a type-1 CG Config 1 for unidirectional Tx, a type-1 CG Config 1 for unidirectional Rx, a type-1 CG Config 1 for bidirectional SL communication, etc.) such techniques may be applied to type-2 CGs. In a type-2 CG scenario, for example, periodicity may be configured by RRC signaling. Additionally, or alternatively, time domain resource assignment (TDRA) and slot offset may be associated with triggering DCI periodicity. The SL techniques, described herein therefore, include type-2 CG scenarios.

Figure 9:
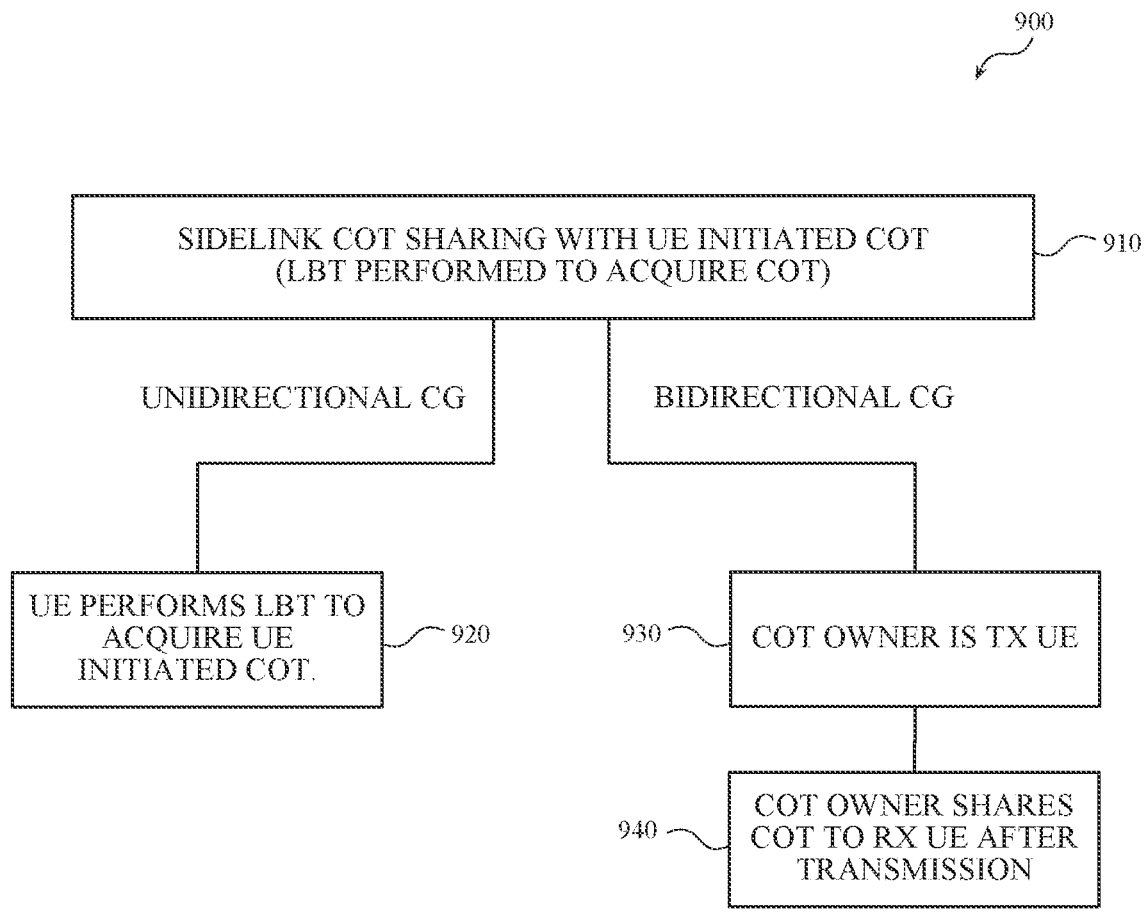
FIG. 9 is a diagram of examples of SL channel occupancy time (COT) sharing with UE initiated COTs.

FIG. 9 is a diagram of examples 900 of SL COT sharing with UE initiated COTs. As described herein, UE initiated COT may include a scenario in which UE 110 may contend for a COT in a shared radio frequency band for SL communication by performing a LBT procedure (e.g., a CAT-4 LBT) in the shared radio frequency band to acquire to a COT in the shared radio frequency band (block 910). Additionally, or alternatively, the manner in which UE 110 operates with respect to the COT may depend on whether UE 110 is communicating in a unidirectional CG scenario or a bidirectional CG scenario. For example, in a unidirectional CG scenario, UE 110 may perform a LBT procedure (e.g., a CAT-4 LBT) to acquire the UE initiated COT and proceed with SL communications directed to a corresponding UE 110 (block 920). By contrast, in a bidirectional CG scenario, the UE 110 that acquires the COT (e.g., via contention) may be the initial COT owner and therefore use the COT as a Tx UE toward a Rx UE via SL (block 930). Additionally, or alternatively, as the COT owner, the Tx UE may share the COT with the Rx UE (before, during, or after an initial SL communication from the Tx UE to the Rx UE) (block 940). In such a scenario, the Rx UE may become aware of the COT and therefore proceed with SL communications. In this manner, COT sharing between UEs 110 for SL purposes may vary depending on whether the UEs 110 are engaged in a unidirectional CG type scenario or a bidirectional CG type scenario. In some implementations, whether UE 110 performs a LBT procedure may depend on one or more factors, such as whether base station 122 has acquired a COT, whether a base station acquired COT may be shared for SL communications, whether a CG-Sidelink-U is within a base station acquired COT, etc.

Figure 10:
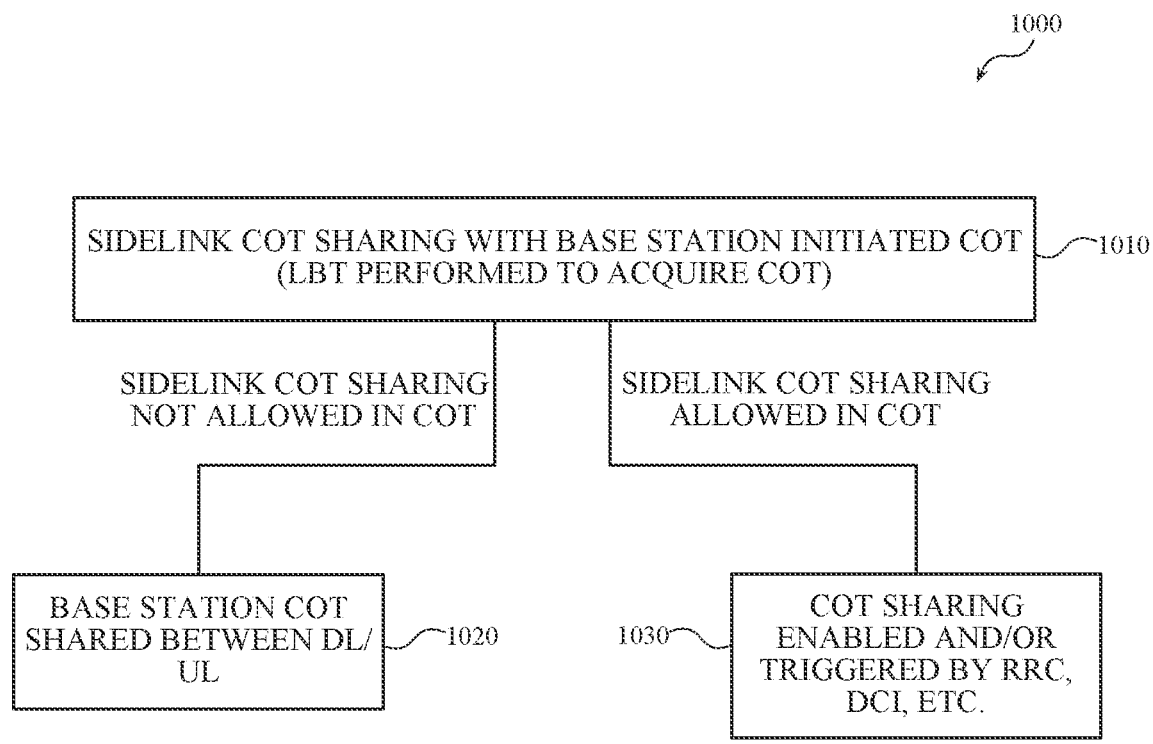
FIG. 10 is a diagram of examples for SL COT sharing with base station-initiated COTs.

FIG. 10 is a diagram of examples 1000 for SL COT sharing with base station-initiated COTs. As described herein, a base station initiated COT may include a scenario in which base station 122 may contend for a COT in a shared radio frequency band (e.g., an unlicensed frequency) by performing a LBT procedure (e.g., a CAT-4 LBT) in the shared radio frequency band to acquire to a COT in the shared radio frequency band, and techniques described herein may involve SL COT sharing of base station initiated COT (block 1010). For example, in scenarios where base station acquired COT is not allowed for SL communications, the base station acquired COT may only be shared for DL/UL purposes (e.g., for transmissions between UE 110 and base station 122) (block 1020).

By contrast, in scenarios where base station acquired COT is allowed for SL communications, the COT sharing may be enabled via RRC signaling from base station 122 to UE 110 (block 1030). In such scenarios, the RRC signaling may indicate whether SL transmission within the base station acquired COT is enabled or disabled. This may apply to type-1 CG RRC configurations. Additionally, or alternatively, for type-2 CG RRC configurations, base station 122 may indicate whether base station acquired COT sharing is enabled/disabled for SL communications in triggering downlink control information (DCI) and/or RRC configuration information. In some implementations, base station 122 may also, or alternatively, indicate dynamically (e.g., within base station acquired COT signaling, such as DCI 2-0) whether base station acquired COT sharing is enabled/disabled for SL communications.

In some implementations, base station 122 may also, or alternatively, indicate whether base station acquired COT sharing is enabled/disabled for SL communications for one or more UEs 110 in particular (e.g., a particular UE of a UE pair, UE group, a particular type of UE, etc.). In some implementations, upon receiving an indication (e.g., an RRC trigger, DCI trigger, etc.) that base station acquired COT sharing is enabled for SL communications, UE 110 may proceed by engaging in SL communications based on the COT information. In addition to indicating whether base station acquired COT sharing is enabled/disabled for SL communications, base station 122 may also, or alternatively, provide grant, configuration, or resource information to enable UE 110 to use the COT for SL communications. Additionally, or alternatively, a SL transmission during a base station acquired COT may involve a LBT procedure (e.g., a category 2 (CAT-2) LBT) based on how a gap corresponding to the COT compares to a given threshold (e.g., when the gap is greater than or equal to 16 microseconds).

Figure 11:
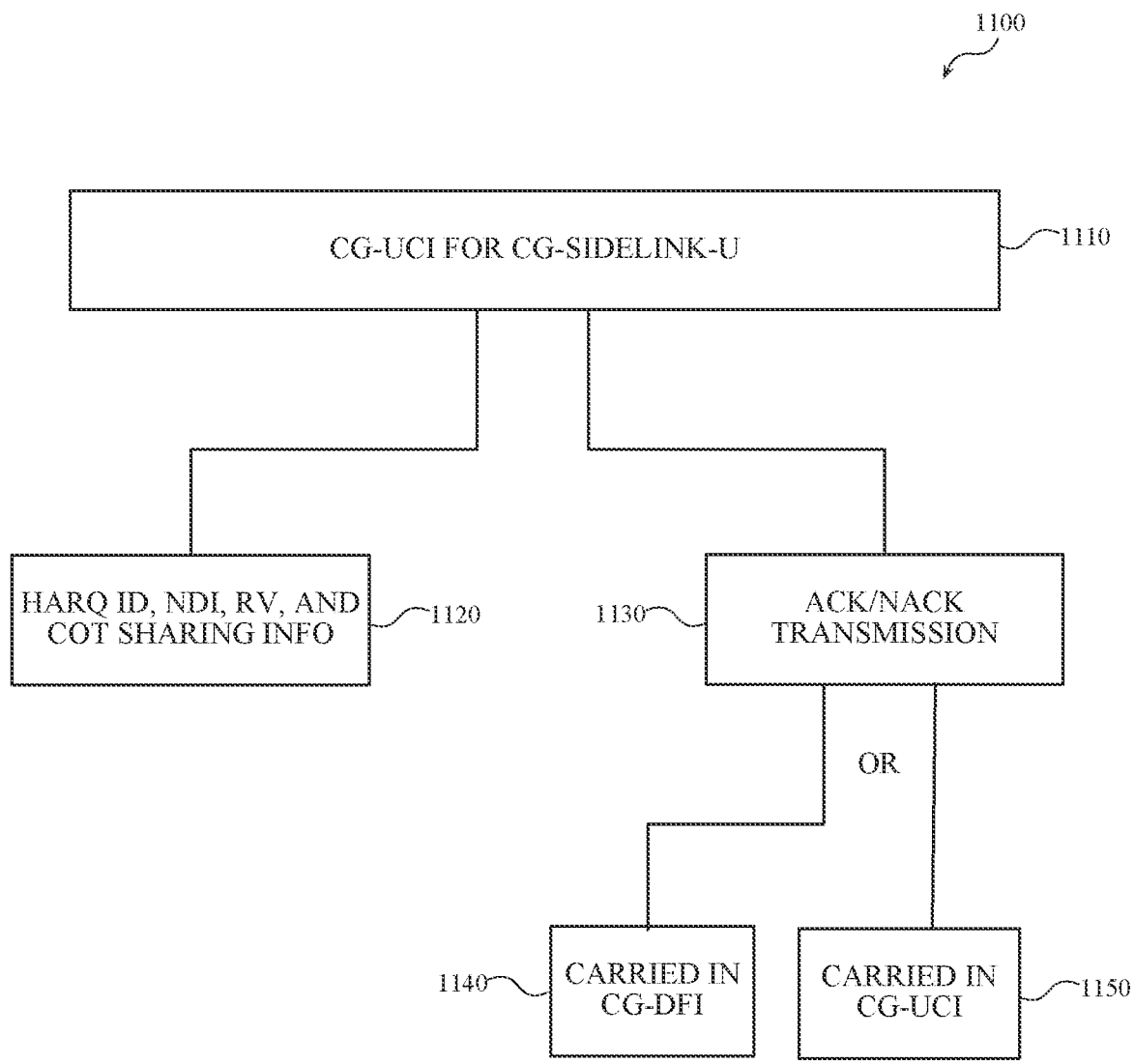
FIG. 11 is a diagram of examples for CG uplink control information (CG-UCI) for a CG SL in the unlicensed spectrum (CG-Sidelink-U).

FIG. 11 is a diagram of examples 1100 for CG uplink control information (CG-UCI) for a CG SL in the unlicensed spectrum (CG-Sidelink-U). As shown, techniques described herein may include information included in CG-UCI for CG-Sidelink-U (block 1110). For example, CG-UCI may include a HARQ ID, a new data indicator (NDI), a redundancy version (RV), and/or COT sharing information (block 1120). Additionally, or alternatively, CG-UCI may include an acknowledgement (ACK) or negative acknowledgement (NACK) transmission (block 1130). In some implementations, the ACK/NACK information may be included in downlink feedback information (DFI) (e.g., DFI of the CG) (block 1140). Additionally, or alternatively, the ACK/NACK information may be included in UCI (e.g., UCI of the CG). The UCI of the CG (or CG-UCI) may be similar to a UCI transmission for a DL PDSCH (block 1150).

Figure 12:
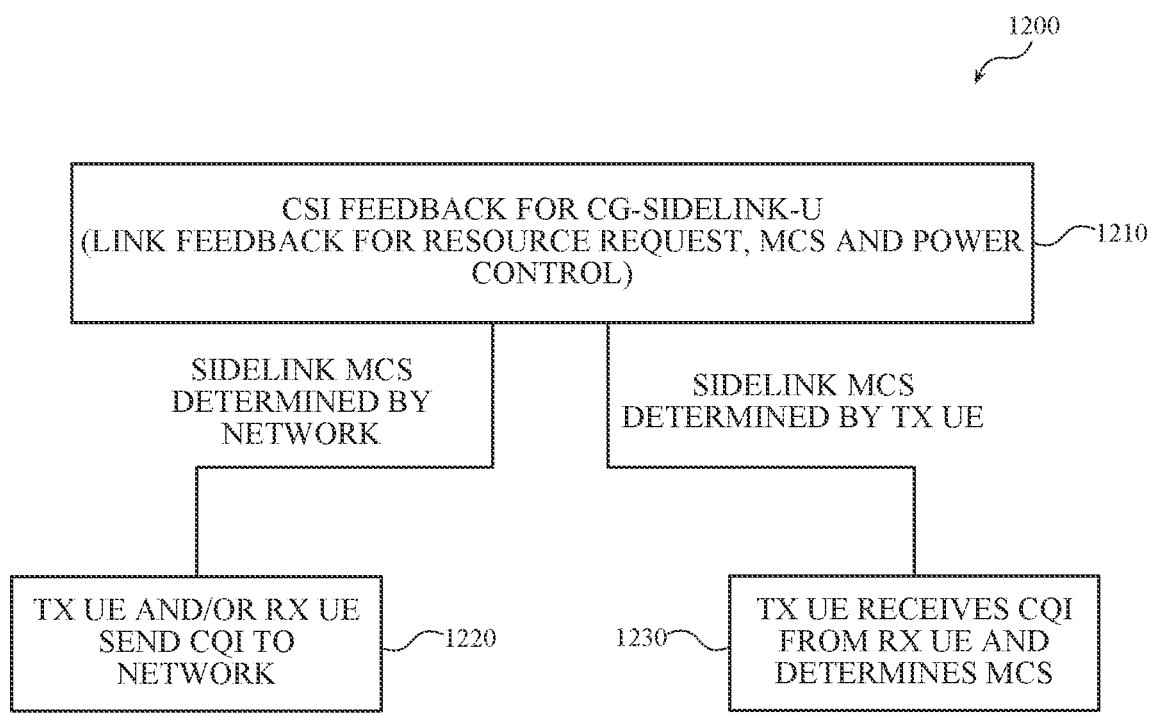
FIG. 12 is a diagram of examples for providing channel state information (CSI) feedback for CG-Sidelink-U.

FIG. 12 is a diagram of examples 1200 for providing channel state information (CSI) feedback for CG-Sidelink-U. CSI (or CSI feedback) may include an indication of how good or bad a particular channel may be at a particular time (e.g., based on channel measurements, signal quality, performance metrics, etc.). CSI may include one or more types of information, including a channel quality indicator (CQI), preceding matrix index (PMI), rank indicator (RI), etc. As shown, techniques described herein may include CSI feedback information for CG-Sidelink-U (block 1210). CSI feedback for CG-Sidelink-U may include link feedback for resources requests, modulation and coding scheme (MCS) information, and/or power control information.

In some implementations, MCS for a SL may be determined by the network (e.g., base station 122 and/or one or more other network devices). In some implementations, the Tx UE and Rx UE of a particular SL may each send CQI to base station 122 directly (block 1220). In other implementations, a Rx UE of a particular SL may send CQI to a Tx UE of the SL (e.g., as CSI feedback), and the Tx UE may forward the CQI of the Rx UE (in combination with CQI from the Tx UE) to base station 122 as CSI feedback regarding the SL between the Tx UE and Rx UE (block 1220). In some implementations, such as implementations involving a type-2 CG-Sidelink-U scenario, the CQI may be sent together with an activation request. In other implementations, MCS for a SL may be determined by a Tx UE of the SL. In such implementations, a Rx UE of a particular SL may send CQI feedback to a Tx UE of the SL, and the Tx UE may determine the MCS for the SL (block 1230).

Techniques, described herein, may also include solutions for power control (e.g., transmission or signal power) between UEs engaging in SL communications. In some implementations, one or more network devices (e.g., base station 122) may manage UE SL transmission power based on an open loop system (e.g., based on SL feedback information from UEs 110 of one or more UE pairs and/or UE groups). In some implementations, SL transmission power may be based on a closed loop system (e.g., where one or more UEs 110 of a UE pair or UE group may manage power control based on CSI and/or other feedback information without input from the network). In yet other implementations, SL transmission power may be based on a combination of open loop and closed loop systems (e.g., where the network may specify a SL-specific maximum level of transmission power (e.g., a Pc_max value) and one or more UEs 110 of a particular UE pair or UE group may manage transmission power within the designated transmission power maximum.

Techniques, described herein, may also include solutions for clear channel assessment (CCA) procedures. CCA may include a determination of whether a channel is clear or otherwise open for communication. In some implementations, UE 110 and/or base station 122 may perform a CCA procedure based on, for example, a ratio of a power control maximum (Pc_max) value and a power out (Pout) value. In some implementations, such as unidirectional CG scenarios, a Pout value may be a Tx Effective Isotropic Radiated Power (EIRP). In some implementations, such as bidirectional CG scenarios, a Pout value may be a maximum Tx EIRP.

Figure 13:
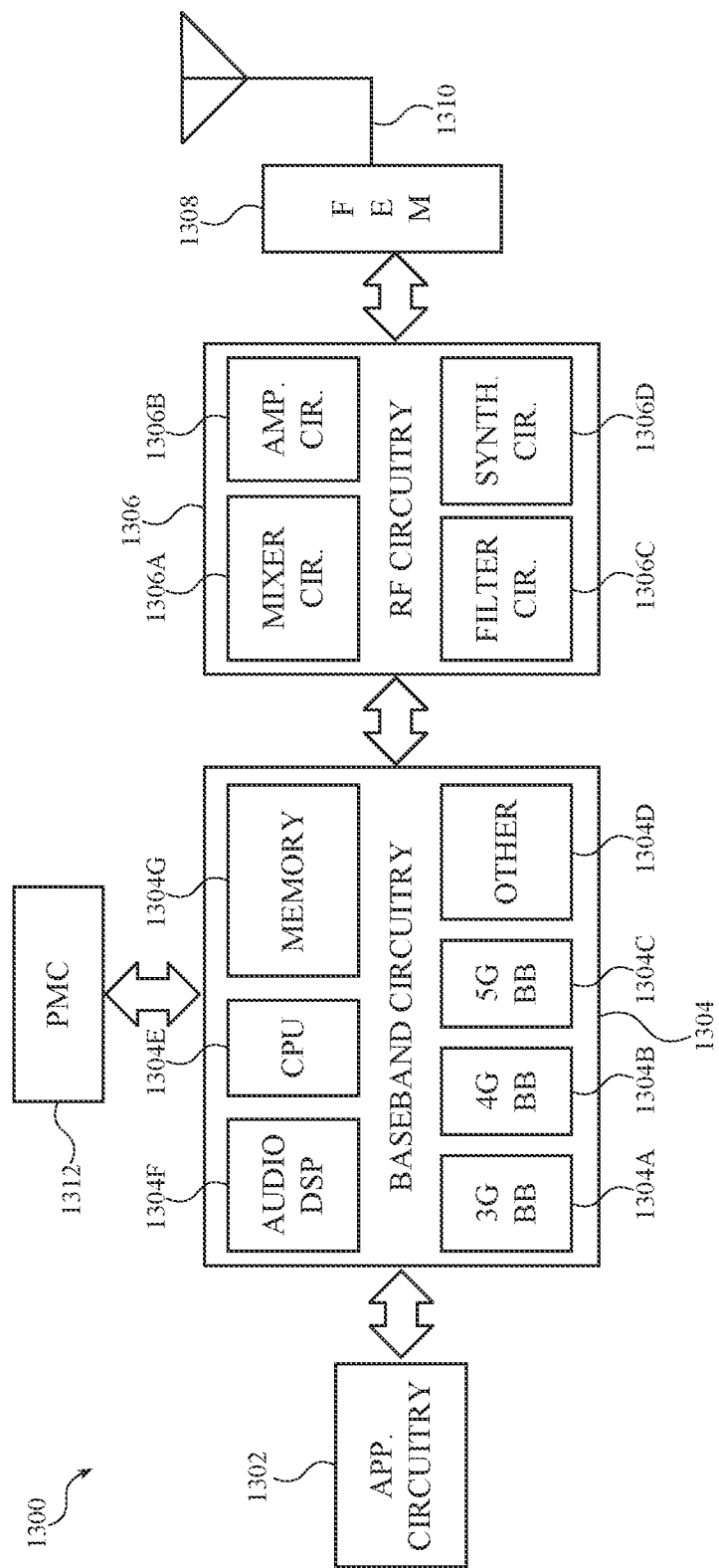
FIG. 13 is a diagram of an example of components of a device according to one or more implementations described herein.

FIG. 13 is a diagram of an example of components of a device according to one or more implementations described herein. In some implementations, the device 1300 can include application circuitry 1302, baseband circuitry 1304, RF circuitry 1306, front-end module (FEM) circuitry 1308, one or more antennas 1310, and power management circuitry (PMC) 1312 coupled together at least as shown. The components of the illustrated device 1300 can be included in a UE or a RAN node. In some implementations, the device 1300 can include fewer elements (e.g., a RAN node may not utilize application circuitry 1302, and instead include a processor/controller to process IP data received from a CN such as 5GC 130 or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (C-RAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 2G, 6G, etc.). The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, modulation/demodulation circuitry of the baseband circuitry 1304 can include Fast-Fourier Transform (FFT), preceding, or constellation mapping/de-mapping functionality. In some implementations, encoding/decoding circuitry of the baseband circuitry 1304 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1304 can include one or more audio digital signal processor(s) (DSP) 1304F. The audio DSPs 1304F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1304 and the application circuitry 1302 can be implemented together such as, for example, on a system on a chip (SOC).

In some implementations, the baseband circuitry 1304 can provide for communication compatible with one or more radio technologies. For example, in some implementations, the baseband circuitry 1304 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path. In some implementations, the mixer circuitry 1306A of the receive signal path can be configured to down-convert RF signals received from the FEM circuitry 1308 based on the synthesized frequency provided by synthesizer circuitry 1306D. The amplifier circuitry 1306B can be configured to amplify the down-converted signals and the filter circuitry 1306C can be a low-pass filter (LPF) or band-pass filter (BPF) configured to remove unwanted signals from the down-converted signals to generate output baseband signals. Output baseband signals can be provided to the baseband circuitry 1304 for further processing. In some implementations, the output baseband signals can be zero-frequency baseband signals, although this is not a requirement. In some implementations, mixer circuitry 1306A of the receive signal path can comprise passive mixers, although the scope of the implementations is not limited in this respect.

In some implementations, the mixer circuitry 1306A of the transmit signal path can be configured to up-convert input baseband signals based on the synthesized frequency provided by the synthesizer circuitry 1306D to generate RF output signals for the FEM circuitry 1308. The baseband signals can be provided by the baseband circuitry 1304 and can be filtered by filter circuitry 1306C.

In some implementations, the mixer circuitry 1306A of the receive signal path and the mixer circuitry 1306A of the transmit signal path can include two or more mixers and can be arranged for quadrature down conversion and up conversion, respectively. In some implementations, the mixer circuitry 1306A of the receive signal path and the mixer circuitry 1306A of the transmit signal path can include two or more mixers and can be arranged for image rejection (e.g., Hartley image rejection). In some implementations, the mixer circuitry 1306A of the receive signal path and the mixer circuitry' 1306A can be arranged for direct down conversion and direct up conversion, respectively. In some implementations, the mixer circuitry 1306A of the receive signal path and the mixer circuitry 1306A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode implementations, a separate radio IC circuitry can be provided for processing signals for each spectrum, although the scope of the implementations is not limited in this respect.

In some implementations, the synthesizer circuitry 1306D can be a fractional-N synthesizer or a fractional N/N+1 synthesizer, although the scope of the implementations is not limited in this respect as other types of frequency synthesizers can be suitable. For example, synthesizer circuitry 1306D can be a delta-sigma synthesizer, a frequency multiplier, or a synthesizer comprising a phase-locked loop with a frequency divider.

The synthesizer circuitry 1306D can be configured to synthesize an output frequency for use by the mixer circuitry 1306A of the RF circuitry 1306 based on a frequency input and a divider control input. In some implementations, the synthesizer circuitry 1306D can be a fractional N/N+1 synthesizer.

In some implementations, frequency input can be provided by a voltage controlled oscillator (VCO), although that is not a requirement. Divider control input can be provided by either the baseband circuitry 1304 or the applications circuitry 1302 depending on the desired output frequency. In some implementations, a divider control input (e.g., N) can be determined from a look-up table based on a channel indicated by the applications circuitry 1302.

Synthesizer circuitry 1306D of the RF circuitry 1306 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1306D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310. In various implementations, the amplification through the transmit or receive signal paths can be done solely in the RF circuitry 1306, solely in the FEM circuitry 1308, or in both the RF circuitry 1306 and the FEM circuitry 1308.

In some implementations, the FEM circuitry 1308 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310).

In some implementations, the PMC 1312 can manage power provided to the baseband circuitry 1304. In particular, the PMC 1312 can control power-source selection, voltage scaling, battery charging, or DC-to-DC conversion. The PMC 1312 can often be included when the device 1300 is capable of being powered by a battery, for example, when the device is included in a UE. The PMC 1312 can increase the power conversion efficiency while providing desirable implementation size and heat dissipation characteristics.

While FIG. 13 shows the PMC 1312 coupled only with the baseband circuitry 1304. However, in other implementations, the PMC 1312 may be additionally or alternatively coupled with, and perform similar power management operations for, other components such as, but not limited to, application circuitry 1302, RF circuitry 1306, or FEM circuitry 1308.

In some implementations, the PMC 1312 can control, or otherwise be part of, various power saving mechanisms of the device 1300. For example, if the device 1300 is in an RRC_Connected state, where it is still connected to the RAN node as it expects to receive traffic shortly, then it can enter a state known as Discontinuous Reception Mode (DRX) after a period of inactivity. During this state, the device 1300 can power down for brief intervals of time and thus save power.

If there is no data traffic activity for an extended period of time, then the device 1300 can transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1302 and processors of the baseband circuitry 1304 can be used to execute elements of one or more instances of a protocol stack. For example, processors of the baseband circuitry 1304, alone or in combination, can be used execute Layer 3, Layer 2, or Layer 1 functionality, while processors of the baseband circuitry 1304 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 14:
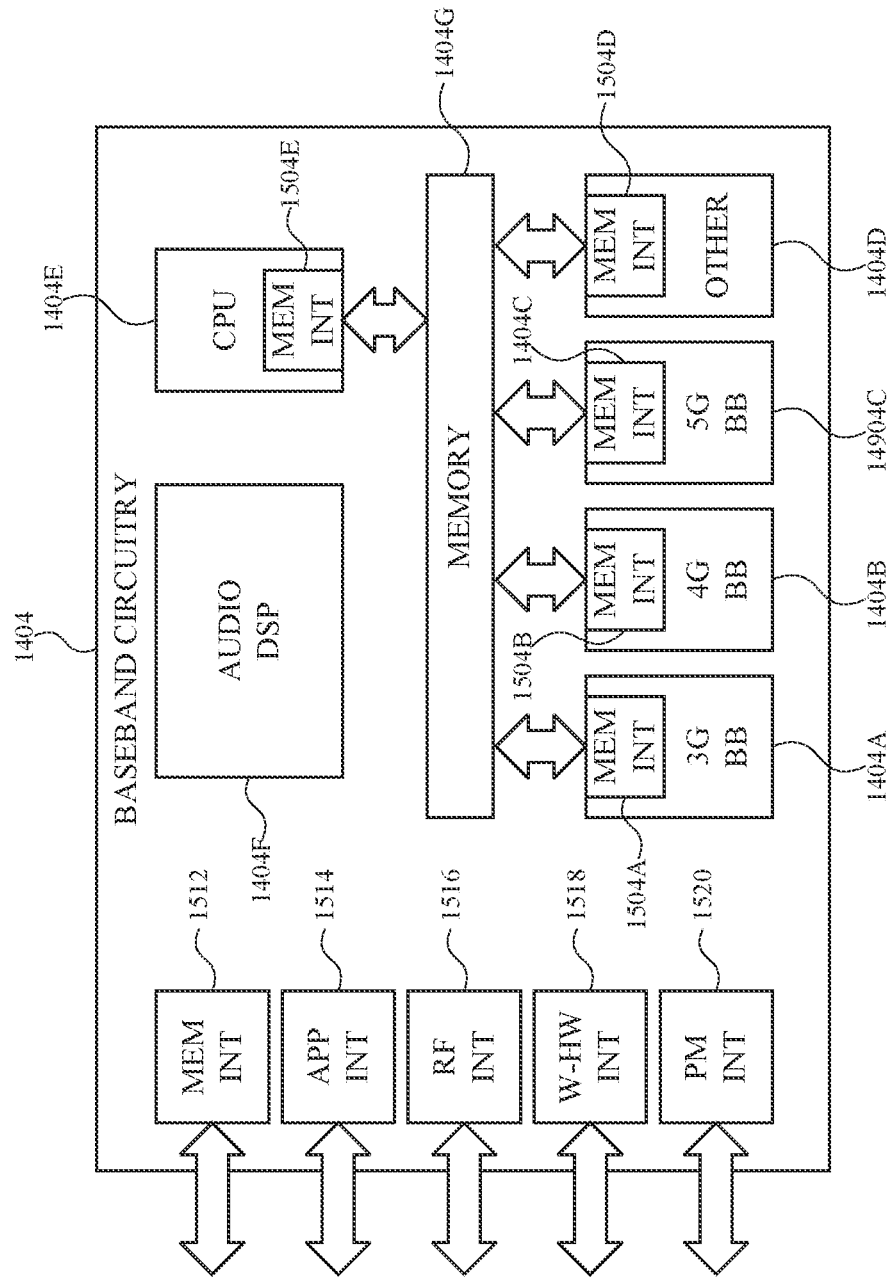
FIG. 14 is a diagram of example interfaces of baseband circuitry according to one or more implementations described herein.

FIG. 14 is a diagram of example interfaces of baseband circuitry according to one or more implementations described herein. As discussed above, the baseband circuitry 1304 of FIG. 13 can comprise processors 1304A-1304E and a memory 1304G utilized by said processors. Each of the processors 1304A-1304E can include a memory interface, 1404A-1404E, respectively, to send/receive data to/from the memory 1304G.

The baseband circuitry 1304 can further include one or more interfaces to communicatively couple to other circuitries/devices, such as a memory interface 1412 (e.g., an interface to send/receive data to/from memory external to the baseband circuitry 1304), an application circuitry interface 1413 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In a first example a baseband processor of a user equipment (UE) comprises: one or more processors configured to: receive, from a base station, a configuration grant (CG) for sidelink (SL) communication with another UE, the CG for SL communication comprising wireless resources for direct communication with the another UE via an unlicensed wireless spectrum; and communicating, with the another UE, based on the CG for SL communication.

In a second example, the CG for SL communication comprises a unidirectional grant of wireless resources for transmitting information to the another UE. In a third example, the CG for SL communication comprises a unidirectional grant of wireless resources for receiving information from the another UE. In a fourth example, the CG for SL communication corresponds to a multicast transmission, from the base station, to a plurality of UEs of a UE group. In a fifth example, the CG for SL communication is received via radio resource control (RRC) signaling or via a combination of RRC signaling and downlink control information (DCI).

In a sixth example, the RRC signaling or the DCI comprises periodicity information for the wireless resources of the CG for SL communication. In a seventh example, the CG for SL communication comprises a bidirectional grant of wireless resources for transmitting information to the another UE and receiving information from the another UE.

In an eight example, prior to communicating with the another UE, the one or more processors are configured to perform listen-before-talk (LBT) procedure regarding the wireless resources of the CG for SL communication. In a ninth example, communicating with the another UE comprises providing the another UE with channel occupancy time (COT) information regarding the wireless resources of the CG for SL communication. In a tenth example, the COT information comprises a COT initiated by the UE.

In an eleventh example, the COT information comprises a COT initiated by the base station. In a twelfth example, the one or more processors are further configured to: receive, from the base station, an indication that SL communication with the another UE may occur during the COT initiated by the base station. In a thirteenth example, communicating with the another UE comprises receiving, from the another UE, channel occupancy time (COT) information regarding the wireless resources of the CG for SL communication. In a fourteenth example, communicating with the another UE comprises transmitting uplink control information (UCI), based on the CG, to the another UE. In a fifteenth example, the one or more processors are further configured to: provide the base station with channel state information (CSI) feedback regarding the wireless resources of the CG for SL communication. In a sixteenth example, the one or more processors are further configured to: receive, from the another UE, channel quality indicator (CQI) information regarding the wireless resources of the CG for SL communication; and determine, based on the CQI information, a modulation and coding scheme (MCS) for SL communications with the another UE.

In a seventeenth example, the one or more processors are further configured to: determine a transmission power for communicating with the another UE based on at least one of: transmission power information received from the base station; transmission power information determined by the UE; the CG for SL communication comprising a unidirectional CG; or the CG for SL communication comprising a bidirectional CG. In an eighteenth example a method that includes any action or combination of actions as substantially described herein in the Detailed Description or any combination of the Figures. In a nineteenth example, an apparatus configured to perform any action or combination of actions as substantially described herein in the Detailed Description or any combination of the Figures. In a twentieth example, a non-transitory computer-readable medium that stores instructions that, when executed, cause the performance of any action or combination of actions as substantially described herein in the Detailed Description or any combination of the Figures.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor, comprising:
   a memory configured to store instructions; and
   a processing circuitry coupled to the memory and, when executing the instructions, configured to:
      receive a configured grant (CG) for sidelink (SL) communication with another user equipment (UE), the CG for SL communication comprising a grant of wireless resources of an unlicensed wireless spectrum for direct communication with the another UE;
      initiate a first channel occupancy time (COT) based on the CG for SL communication using a listen before talk (LBT) procedure during a second COT initiated by a base station, wherein sharing of the second COT for SL communication is not allowed; and
   control radio frequency (RF) circuitry to communicate, with the another UE during the first COT, based on the CG for SL communication.

2. The baseband processor of claim 1, wherein the CG for SL communication comprises a multicast transmission, from the base station, to a plurality of UEs of a UE group, wherein the plurality of UEs comprises the UE and the another UE.

3. The baseband processor of claim 1, wherein the CG for SL communication is received via radio resource control (RRC) signaling or via a combination of RRC signaling and downlink control information (DCI).

4. The baseband processor of claim 3, wherein the RRC signaling or the DCI comprises periodicity information for the wireless resources of the CG for SL communication.

5. The baseband processor of claim 1, wherein controlling the RF circuitry to communicate with the another UE comprises controlling the RF circuitry to provide the another UE with COT information regarding the wireless resources of the CG for SL communication during the first COT, wherein a portion of the first COT after a transmission by the UE to the another UE is shared with the another UE.

6. The baseband processor of claim 1, wherein the LBT procedure comprises a CAT-4 LBT procedure.

7. The baseband processor of claim 1, wherein controlling the RF circuitry to communicate with the another UE comprises receiving, from the another UE, COT information regarding the wireless resources of the CG for SL communication during a third COT initiated by the another UE, wherein a portion of the third COT after a transmission by the another UE to the UE is shared with the UE.

8. The baseband processor of claim 1, wherein controlling the RF circuitry to communicate with the another UE comprises controlling the RF circuitry to transmit uplink control information (UCI), based on the CG, to the another UE.

9. The baseband processor of claim 1, wherein the processing circuitry is further configured to:
control the RF circuitry to provide the base station with channel state information (CSI) feedback regarding the wireless resources of the CG for SL communication.

10. The baseband processor of claim 1, wherein the processing circuitry is further configured to:
determine a transmission power for communicating with the another UE based on at least one of:
transmission power information received from the base station;
transmission power information determined by the UE; or
the CG for SL communication.

11. A user equipment (UE), comprising:
one or more processors configured to cause the UE to:
receive, from a base station, a configured grant (CG) for sidelink (SL) communication with another UE, the CG for SL communication comprising a grant of wireless resources of an unlicensed wireless spectrum for direct communication with the another UE;
initiate a first channel occupancy time (COT) based on the CG for SL communication using a listen before talk (LBT) procedure during a second COT initiated by the base station, wherein sharing of the second COT for SL communication is not allowed;
communicate with the another UE during the first COT based on the CG for SL communication.

12. The UE of claim 11, wherein the CG for SL communication further comprises
a multicast transmission, from the base station, to a plurality of UEs of a UE group, the plurality of UEs comprising the UE and the another UE.

13. A method, performed by a user equipment (UE), the method comprising:
receiving, from a base station, a configuration grant (CG) for sidelink (SL) communication with another UE, the CG for SL communication comprising a grant of wireless resources of an unlicensed wireless spectrum for direct communication with the another UE;
initiate a first channel occupancy time (COT) based on the CG for SL communication using a listen before talk (LBT) procedure during a second COT initiated by the base station, wherein sharing of the second COT for SL communication is not allowed;
and
communicating, with the another UE during the first COT, based on the CG for SL communication.

14. The method of claim 13, wherein the CG for SL communication further comprises
a multicast transmission, from the base station, to a plurality of UEs of a UE group, the plurality of UEs comprising the UE and the another UE.

15. The UE of claim 11, wherein the one or more processors are further configured to cause the UE to:
provide the another UE with COT information regarding the wireless resources of the CG for SL communication during the first COT, wherein a portion of the first COT after a transmission by the UE to the another UE is shared with the another UE.

16. The UE of claim 11, wherein the LBT procedure comprises a CAT-4 LBT procedure.

17. The UE of claim 11, wherein communicating with the another UE comprises receiving, from the another UE, COT information regarding the wireless resources of the CG for SL communication during a third COT initiated by the another UE, wherein a portion of the third COT after a transmission by the another UE to the UE is shared with the UE.

18. The method of claim 13, further comprising:
providing the another UE with COT information regarding the wireless resources of the CG for SL communication during the first COT, wherein a portion of the first COT after a transmission by the UE to the another UE is shared with the another UE.

19. The method of claim 13, wherein the LBT procedure comprises a CAT-4 LBT procedure.

20. The method of claim 13, wherein communicating with the another UE comprises receiving, from the another UE, COT information regarding the wireless resources of the CG for SL communication during a third COT initiated by the another UE, wherein a portion of the third COT after a transmission by the another UE to the UE is shared with the UE.

* * * * *